2,145,263

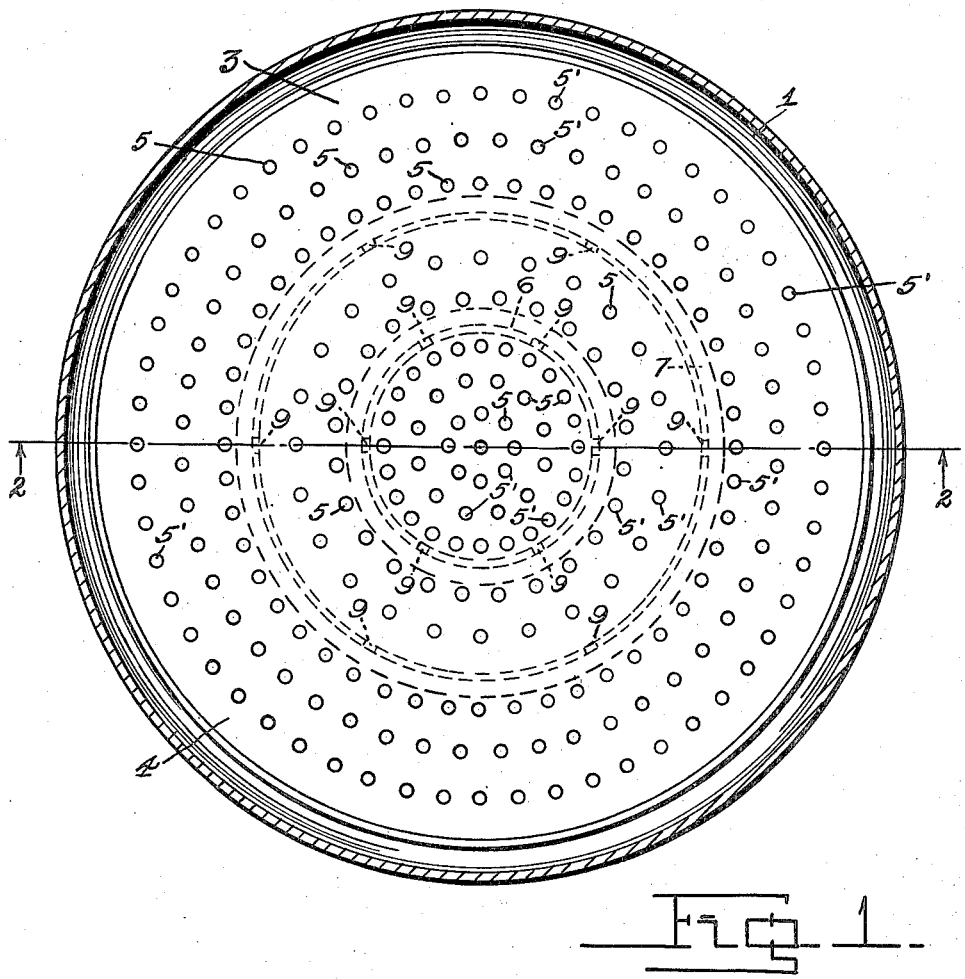
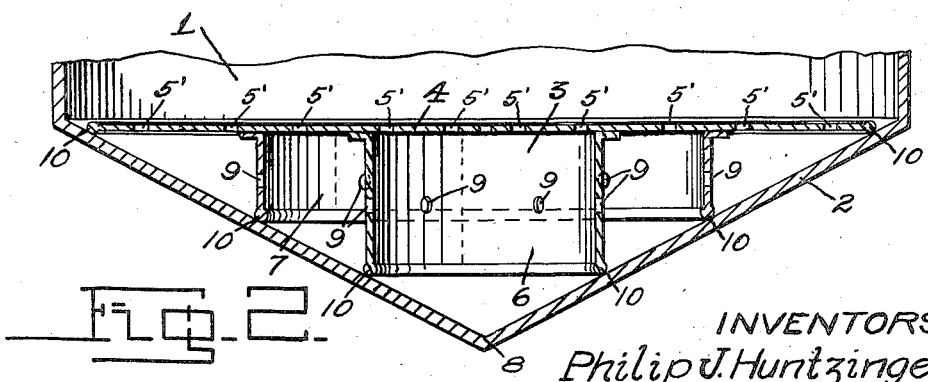
INVENTORS
Philip J. Huntzinger
George R. Snyder.
BY
Adam Richmond
ATTORNEY Patented Jan. 31, 1939

UNITED STATES PATENT OFFICE 2,145,263

ROASTER PLATFORM

Philip J. Huntzinger and George R. Snyder,
Carlisle Barracks, Pa.

Application September 10, 1937, Serial No. 163,250

2 Claims. (Cl. 53—6)

(Granted under the act of March 3, 1883, as
amended April 30, 1928; 370 O. G. 757)

This invention described herein may be manufactured and used by or for the Government for Governmental purposes, without the payment to us of any royalty thereon.

This invention relates to a roasting device, more particularly it is directed to an improved platform for use in the roasting device.

One of the objects of the invention is to provide a roaster platform for holding various articles of foods out of a liquid within a cooking device to prevent boiling thereof, whereby the food, such as meat, fowl, fish or vegetables can be roasted and more quickly and safely prepared.

Another object of the invention is to provide an apertured roaster platform, including apertured supports of such construction that when positioned within a steam jacket roaster, the steam is forced to move evenly upward throughout the various articles of food, and the juices from the food are caused to descend to the bottom of the roaster at various places.

Still another object of the invention is to provide a roaster platform with a flat circular disc having a plurality of ring-shaped or annular supports provided thereon which vary in height and provide a terraced conical incline or inclined interrupted surface with the outer peripheral edge of the disc, whereby the roaster platform may be seated within a jacket roaster having a conical-shaped bottom, there being a plurality of spaced concentric circles of holes of a predetermined size in the disc and a plurality of spaced holes of a predetermined size in the supports.

With the above and other objects and advantages in view, the invention consists of certain features of construction and operation of parts, as will hereinafter appear and in which—

Fig. 1 is a top plan view of the invention applied to a roaster; and

Fig. 2 is a vertical sectional view taken on the line 2—2 of Fig. 1.

In the illustrated embodiment characterizing the invention 1 indicates a steam jacket roaster of the type having a conical-shaped bottom portion 2 and in which the improved platform 3 is adapted to be placed for roasting various articles of food.

The roaster platform 3 is made of any suitable material, such as stainless steel, aluminum or the like, and comprises a flat circular disc 4 containing a plurality of concentric circles of holes or perforations 5, which gradually increase in diameter from the center of the disc to adjacent the outer circumferential edge thereof. The holes 5' in each circle are of a predetermined diameter and are so arranged that as far as practical they do not come into line or radii with the holes of the other circles. In the present instance there are shown eight concentric circles of holes, together with a hole in the center of the disc, and it has been found that for the device to give the most satisfactory results each hole should be substantially ⅝ of an inch in diameter. The disc 4 is made of a sufficient diameter to extend substantially across the upper end of the conical-shaped bottom portion 2 of the roaster and to abut against the inclined inner upper surface thereof. On the disc 4 are two concentric cylindrical supports or chimneys 6 and 7 which are graduated in height and are secured to the bottom side of the disc in any suitable manner or made integral therewith, whereby a unitary structure is provided. The support 6 is made of sufficient depth to abut against the inner surface adjacent the lower end 8 of the bottom 2 of the roaster 1, and the support 7 surrounds the support 6 and is made larger in diameter and smaller in depth than the support 6, whereby the lower edge thereof is adapted to abut against the inclined inner side of the conical bottom portion 2 of the roaster intermediate the lower edge of the support 6 and the peripheral edge of the disc 4. The lower outer edges of the supports 6 and 7 provide an inclined or interrupted surface with the outer peripheral edge of the disc, whereby the roaster platform 3 may seat within the conical-shaped bottom portion 2 of the roaster. The roaster platform may also rest on ribs which may be provided in the bottom of the roaster.

The supports 6 and 7 are provided with a plurality of spaced holes or perforations 9, and it has been found that to get the most satisfactory results from the roaster each support should be provided with six holes, each hole being ⅜ of an inch in diameter in order to have the proper proportion and size with respect to the holes 5' of the disc 4. To reenforce the roaster platform the disc 4 and the supports 6 and 7 are provided with beaded edges 10.

In operation, assuming fluid, such as gravies, water, etc., has been poured into the roaster 1 and that it has been closed in the upper end thereof by a suitable cover (not shown), also that meat, fowl, fish or vegetables have been placed on the disc 4 of the platform, the steam is forced to move evenly upward through the holes 5' in the disc 4 of the roaster platform 3 throughout the mass of food and the juices therefrom readily descend to the bottom of the roaster at various places. The holes 9 in the chimneys or cylindrical supports 6 and 7 are made at intervals to allow the steam to circulate or escape and make its way through the circles or holes 5' in the disc 4.

It will thus be seen that there is provided a highly novel and useful form of roaster platform which is well adapted for all the purposes indicated. Even though the invention is described and shown as comprising certain features of construction and operation of parts, it is nevertheless to be understood that various changes may be made therein without departing from the spirit or scope of the invention.

Having described our invention, what we claim as new and wish to secure by Letters Patent, is—

1. In combination with a roaster of the type described having a conical bottom portion, a removable platform member in the conical bottom comprising a perforated disk and a plurality of cylindrical supporting members conforming to and resting on said conical bottom, said cylindrical supporting members being concentrically arranged to provide a series of independent compartments.

2. In combination with a roaster of the type described having a conical bottom portion, a removable platform member in the conical bottom comprising a perforated disk and a plurality of perforated cylindrical supporting members conforming to and resting on said conical bottom, said supporting members being concentrically arranged to provide a series of independent compartments, the innermost supporting member being greater in height and smaller in diameter than the outermost supporting member.

PHILIP J. HUNTZINGER.
GEORGE R. SNYDER.